(12) United States Patent
Tomita et al.

(10) Patent No.: US 7,974,540 B2
(45) Date of Patent: Jul. 5, 2011

(54) COMMUNICATION SYSTEM AND COMMUNICATION METHOD USING THE SAME

(75) Inventors: Akihisa Tomita, Tsukuba (JP); Kazuo Nakamura, Tokyo (JP); Akio Tajima, Tokyo (JP); Akihiro Tanaka, Tokyo (JP); Yoshihiro Nanbu, Tokyo (JP); Shuuji Suzuki, Tokyo (JP); Takeshi Takeuchi, Tokyo (JP); Wakako Maeda, Tokyo (JP); Seigo Takahashi, Tokyo (JP)

(73) Assignees: Japan Science and Technology Agency, Kawaguchi-shi (JP); NEC Corporation, Tokyo (JP)

( * ) Notice: Subject to any disclaimer, the term of this patent is extended or adjusted under 35 U.S.C. 154(b) by 856 days.

(21) Appl. No.: 10/581,037

(22) PCT Filed: Nov. 29, 2004

(86) PCT No.: PCT/JP2004/017681
§ 371 (c)(1),
(2), (4) Date: Dec. 28, 2006

(87) PCT Pub. No.: WO2005/053219
PCT Pub. Date: Jun. 9, 2005

(65) Prior Publication Data
US 2007/0110242 A1    May 17, 2007

(30) Foreign Application Priority Data

Nov. 28, 2003  (JP) ................................. 2003-398491
Nov. 19, 2004  (JP) ................................. 2004-335228

(51) Int. Cl.
*H04J 14/06* (2006.01)
*H04L 9/00* (2006.01)
*G02F 1/01* (2006.01)
*G02B 5/30* (2006.01)

(52) U.S. Cl. ............. 398/152; 380/277; 380/278; 385/1; 385/2; 385/3; 385/11; 385/24; 398/140; 359/485; 359/502

(58) Field of Classification Search .................. 398/152, 398/140
See application file for complete search history.

(56) References Cited

U.S. PATENT DOCUMENTS
5,471,545 A * 11/1995 Negami et al. .................... 385/1
(Continued)

FOREIGN PATENT DOCUMENTS
JP     05241104 A * 9/1993
(Continued)

OTHER PUBLICATIONS

Nishioka ["Circular Type Quantum Key distribution", IEEE Photonics Technology Letters, vol. 14, No. 4, Apr. 2002].*
(Continued)

*Primary Examiner* — Ken N Vanderpuye
*Assistant Examiner* — Oommen Jacob
(74) *Attorney, Agent, or Firm* — Oblon, Spivak, McClelland, Maier & Neustadt, L.L.P.

(57) ABSTRACT

A communication system capable of employing polarization-dependent phase modulators with a reversing configuration that preserves security against disturbance of a polarization state at a transmission path but without using Faraday mirrors and a communication method using the same are provided.

A quantum cryptography system of the present invention includes a first station 1, a transmission path 2, and a second station 3. The first station 1 has means for emitting time-divided optical pulses into the transmission path 2 and measuring a phase difference between the optical pulses returning from the transmission path 2. The transmission path 2 is a medium of light. The second station 3 has means for reversing traveling directions of the optical pulses, means for producing a phase difference, corresponding to a random number bit value to be transmitted, between the time-divided optical pulses, means for splitting the entering optical pulse into orthogonally polarized components and producing a 180-degree phase difference therebetween, means for rotating each polarization direction by 90 degrees, means for eliminating a component resulting from a deviation from the polarization rotation angle of 90 degrees, and means for attenuating optical pulse intensity to include no more than 1 photon per bit.

16 Claims, 3 Drawing Sheets

U.S. PATENT DOCUMENTS

| | | | | |
|---|---|---|---|---|
| 5,929,989 A * | 7/1999 | Mori et al. | | 356/477 |
| 6,188,768 B1 * | 2/2001 | Bethune et al. | | 380/278 |
| 6,438,234 B1 * | 8/2002 | Gisin et al. | | 380/256 |
| 6,915,082 B2 * | 7/2005 | Yano | | 398/188 |
| 7,024,123 B2 * | 4/2006 | Yano | | 398/184 |
| 7,126,691 B2 * | 10/2006 | Gat | | 356/450 |
| 7,227,955 B2 * | 6/2007 | Trifonov et al. | | 380/256 |
| 7,317,574 B2 * | 1/2008 | Zoller et al. | | 359/577 |
| 7,359,512 B1 * | 4/2008 | Elliott | | 380/253 |
| 7,400,724 B2 * | 7/2008 | Weinfurther et al. | | 380/44 |
| 7,403,623 B2 * | 7/2008 | Cerf et al. | | 380/278 |
| 7,457,548 B2 * | 11/2008 | Tomaru | | 398/161 |
| 7,515,716 B1 * | 4/2009 | Elliott | | 380/256 |
| 7,606,371 B2 * | 10/2009 | Zavriyev et al. | | 380/283 |
| 2004/0047633 A1 * | 3/2004 | Hoshida et al. | | 398/102 |
| 2004/0114237 A1 * | 6/2004 | Sedlmayr | | 359/485 |
| 2005/0152540 A1 * | 7/2005 | Barbosa | | 380/28 |
| 2005/0189478 A1 * | 9/2005 | Lagasse | | 250/216 |
| 2005/0217571 A1 * | 10/2005 | Taniguchi et al. | | 117/202 |
| 2006/0139727 A1 * | 6/2006 | Gafsi et al. | | 359/280 |
| 2006/0280509 A1 * | 12/2006 | Tomaru et al. | | 398/188 |
| 2007/0182968 A1 * | 8/2007 | Nishioka et al. | | 356/491 |
| 2008/0260393 A1 * | 10/2008 | Youn et al. | | 398/152 |

FOREIGN PATENT DOCUMENTS

| | | |
|---|---|---|
| JP | 2002 340566 | 11/2002 |
| JP | 2003 289298 | 10/2003 |

OTHER PUBLICATIONS

English Translation of Takara Hidehiko JP 05241104 A.*
Nishioka "Circular Type Quantum Key Distribution" IEEE Photonics Technology Letters vol. 14 No. 4 Apr. 2002.*
Nishioka, Tsuyoshi et al.,"Circular type' quantum key distribution", Nen Ango to Joho Security Symposium Yokoshu, vol. I of II, pp. 43-48, 2002.

* cited by examiner

COMMUNICATION SYSTEM AND COMMUNICATION METHOD USING THE SAME

TECHNICAL FIELD

The present invention relates to communication systems and communication methods using the same, in particular, to a communication system for performing a quantum cryptographic key distribution to share cryptographic keys through optical fiber communication and a communication method using the same.

BACKGROUND ART

In response to the recent explosive growth of the Internet and the practical application of electronic commerce, the social need for cryptographic techniques is rising in order to achieve communication confidentiality, prevent unauthorized alteration, and authenticate individuals. Currently, common key systems such as DES (Data Encryption Standard) encryption and public key systems such as RSA (Rivest Shamir Adleman) encryption are widely used. These systems are based on "computationally secure" schemes. Thus, existing encryption methods are always threatened by advances in computer hardware and decryption algorithms. A practical application of information theoretically secure encryption methods will have a significant impact especially on fields requiring extremely high security such as transactions between banks and exchange of information regarding military and foreign affairs.

The one-time pad method is an encryption method proved to be unconditionally secure in information theory. The one-time pad method is characterized in that cryptographic keys, having the same length as corresponding communication messages, are discarded after being used once. In Non-patent Document 1 cited below, a specific protocol for securely distributing cryptographic keys used in the one-time pad method is suggested. Thereafter, more and more research on quantum cryptography has been carried out. Since physical laws guarantee the security of quantum cryptography, ultimate security independent of the limits of computer performance can be guaranteed. In the quantum cryptography currently studied, 1-bit information is transmitted as a state of a single photon. Hence, a change in the state of the photon caused by an optical fiber, namely a transmission path, markedly reduces the security of quantum cryptography.

In a known quantum cryptographic device (see, for example, Patent Document 2 cited below), an optical pulse is temporally split into two time-divided optical pulses using an interferometer, having different optical paths, at a second station (i.e., a transmitting side). By modulating a phase difference of these time-divided optical pulses, a random number bit, composing a cryptographic key, is represented. The transmitted random number bit is regenerated at a first station (i.e., a receiving side) by causing the two time-divided optical pulses to interfere. Accordingly, optical-path differences of interferometers used at the second station (i.e., the transmitting side) and the first station (i.e., the receiving side) have to be completely the same. In addition, a change in a polarization state at the transmission path lowers interference visibility, which increases reception error rate. The quantum cryptography utilizes the increase in the reception error rate to detect eavesdroppers. Thus, the increase in reception error rate due to the change in the polarization state at the transmission path lowers eavesdropper detection probability, which results in a decrease in the security of the quantum cryptography. Furthermore, in the quantum cryptographic device, with an assumption that there have been eavesdropping acts, the amount of information corresponding to potentially eavesdropped bits in the random number bits groups shared between the first station and the second station is discarded to ascertain the confidentiality of the shared random number bits data. At this time, the reception error rate determines the amount of information to be discarded. If the reception error rate is high, more information has to be discarded, which decreases the amount of shared random number data, thus reducing the generation rate of cryptographic keys in the quantum cryptography.

To address the above problems, as described in Patent Document 1, Patent Document 3 which is a simplified configuration of that described in Patent Document 1, or Non-patent Document 2 cited below, a quantum cryptographic device for compensating the change in the polarization direction using a Faraday mirror has been invented. In this device, a receiver first transmits temporally split optical pulses, whose polarization directions are orthogonal, to a sender. The sender reverses the traveling direction of the transmitted light using the Faraday mirror. At the same time, the sender produces a phase difference between the time-divided optical pulses with a phase modulator after rotating their polarization directions by 90 degrees, and then transmits them back to the receiver. With such a reversing configuration, an interferometer for temporally splitting an optical pulse and an interferometer for recombining the time-divided optical pulses are identical. Thus, interference with high visibility is obtained as long as the optical-path difference of the interferometer is maintained to be constant for a period longer than round trip time of the optical pulses. As is well known, regardless of disturbance of the polarization state at the transmission path, the polarization direction of the retuning light reflected by the Faraday mirror becomes orthogonal to its initial state. Hence, the visibility of the interferometer is not degraded by the disturbance of the polarization state at the transmission path, whereby the security of the quantum cryptography is guaranteed.

Patent Document 1: PCT Japanese Translation Patent Publication NO. 2000-517499
Patent Document 2: Japanese Patent No. 2951408
Patent Document 3: U.S. Pat. No. 6,188,768B1
Non-patent Document 1: Bennet and Brassard, IEEE Int. Conf. on Computers, Systems, and Signal Processing, Bangalore, India, pp. 175 (1984)
Non-patent Document 2: Ribordy, Gautier, Gisin, Guinnard, and Zbinden, Electronics Letters vol. 34, pp. 2116-2117 (1998)

DISCLOSURE OF INVENTION

However, a quantum cryptographic device disclosed in the above-cited Patent Document 2 has some disadvantages.

A first disadvantage is that it is difficult to implement a phase modulator used by a sender. This is due to the following reasons.

The sender produces a phase difference between time-divided optical pulses with a phase modulator. This phase modulator has to satisfy the following conditions.

(1) In BB84 protocol disclosed in the above-cited Non-patent Document 1, which is the only protocol, in quantum cryptography, whose security is mathematically proved, it is necessary to produce four kinds of phase differences of 0 degrees, 90 degrees, 180 degrees, and 270 degrees.

(2) Phase modulation is applied during time intervals between time-divided optical pulses. To preserve coherence of the optical pulses during their transmission, it is necessary to set the time intervals between the optical pulses to no more than a few nanoseconds. Thus, a modulation bandwidth of at least around 1 GHz is required for the phase modulator.

(3) Since a polarization state of light having passed through a transmission path alters, the phase modulator has to show the same modulation characteristics for any polarization state.

It is difficult to satisfy all of the above-described conditions in the phase modulators currently practically used. For example, phase modulators having the modulation bandwidth of 1 GHz or more use lithium niobate or compound semiconductors such as InP. Due to its small loss, the lithium niobate is widely used. However, such phase modulators generally have a polarization dependency, and are usually used with particular polarization directions. On the other hand, there are polarization-independent phase modulators. However, these are designed so that voltage necessary for applying the phase modulations of 0 degrees and 180 degrees is independent of the polarization direction. Thus, this characteristic is not guaranteed at 90 degrees and 270 degrees.

A second disadvantage is that Faraday mirrors are magneto-optical devices, and unsuitable for future expected integration of optical circuits. This is because the magneto-optical devices cannot be composed of materials used in general integrated optical circuits such as silicon, glass, and lithium niobate. According to a method disclosed in the above-cited Patent Document 3, a phase modulator having the polarization dependency can be used, but a Faraday mirror is still required.

A third disadvantage is that cryptographic key generation rate changes depending on the rotation angle accuracy of the Faraday mirror and temperature. This is due to the following.

In a quantum cryptographic device disclosed in the above-cited Patent Document 2, to make an interferometer for temporally splitting an optical pulse and an interferometer for recombining the temporally split optical pulses the same, the sender needs to rotate the polarization directions of the optical pulses by exactly 90 degrees. If the polarization rotation angle deviates from 90 degrees, the optical pulses passing through the same path in the first station (i.e., a receiver) while going and returning increase. The increase of the optical pulses decreases not only interference visibility but also the cryptographic key generation rate.

The accuracy error of the polarization rotation angle of available Faraday mirrors is within ±3 degrees, regarding those having the best characteristics, within ±1 degree. If the polarization rotation angle deviates from 90 degrees by 3 degrees, approximately 3% of photons pass through the interferometer without being combined. Corresponding to this, the rate of the accurate cryptographic key generation decreases.

Moreover, the polarization rotation angle derived from a Faraday effect depends on temperature. As the temperature of a Faraday element changes, the polarization rotation angle also changes. In general, this temperature dependency is −0.12 degrees/degree Celsius. That is, as the temperature of the element changes by 25 degrees Celsius, the polarization rotation angle caused by the Faraday mirror changes by 3 degrees. This also causes the decrease in the cryptographic key generation rate.

An object of the present invention is to enable an accurate 90-degree polarization rotation at the second station (i.e., the transmitter) with a reversing configuration for preserving the security against the disturbance of the polarization state at the transmission path, without using the Faraday mirror which causes the decrease in the cryptographic key generation rate.

In addition, an object of the present invention is to provide a communication system capable of employing a polarization-dependent phase modulator and a communication method using the same.

To this end, the communication systems and the communication methods of the present invention are as follows:

[1] A communication system includes: a transmission path for serving as a transmission medium of light; a first station having means for emitting time-divided optical pulses into the transmission path and measuring a phase difference between the optical pulses returning from the transmission path; and a second station having means for reversing traveling directions of the optical pulses, means for producing the phase difference, corresponding to a value of a random number bit to be transmitted, between the time-divided optical pulses, means for splitting each entering optical pulse into orthogonally polarized components and producing a 180-degree phase difference between the orthogonally polarized components, means for rotating each polarization direction by 90 degrees, and means for combining the orthogonally polarized components and reemitting the optical pulses into the transmission path.

[2] The communication system according to [1], wherein a phase modulator is used as the means for producing the phase difference, and by varying driving voltage to the phase modulator, the 180-degree phase difference is produced between the orthogonally polarized components.

[3] The communication system according to [1], wherein a single phase modulator is used as the means for producing the phase difference corresponding to the value of the random number bit to be transmitted and the means for producing the 180-degree phase difference between the orthogonally polarized components, and by temporally varying driving voltage, the phase difference corresponding to the value of the random number bit and the 180-degree phase difference between the orthogonally polarized components are produced at the same time.

[4] The communication system according to [1], wherein after each entering optical pulse is split into orthogonally polarized components, the split polarized components are input to different terminals of a phase modulator, and the polarization directions thereof are rotated by 90 degrees after the phase difference is produced therebetween, and then the split polarized components are recombined.

[5] The communication system according to [4], wherein after each entering optical pulses is split into the orthogonally polarized components, distances along which the split polarized components propagate before entering the phase modulator are set to be different for each polarized component, and by temporally varying driving voltage, the phase difference corresponding to the value of the random number bit and the 180-degree phase difference between the orthogonally polarized components are produced at the same time.

[6] The communication system according to [4], wherein after each entering optical pulses is split into the orthogonally polarized components, optical paths along which the split polarized components propagate before entering the different terminals of the phase modulator are composed of a polarization-maintaining optical fiber.

[7] The communication system according to [6], wherein by orienting a polarizing axis of the polarization-maintaining optical fiber along electric-field vectors of the orthogonally polarized components of the entering optical pulse, the split polarized components are combined with their polarization directions rotated by 90 degrees.

[8] The communication system according to [4], [5], or [6], wherein a Faraday rotator is used as the means for producing the 180-degree phase difference between the orthogonally polarized components and the means for rotating each polarization direction by 90 degrees.

[9] The communication system according to [1], wherein a polarization beam splitter is used as the means for splitting each of the optical pulses into the orthogonal components and the means for combining the orthogonal components, and antireflection termination is provided at a port, from which a polarized component resulting from a deviation from polarization rotation angle of 90 degrees is output, of the polarization beam splitter.

[10] The communication system according to any one of [1] to [9], wherein the second station has means for attenuating intensity of each optical pulse to include no more than 1 photon per bit when reemitting the optical pulses into the transmission path after combining the orthogonally polarized components, so that a quantum cryptographic key is distributed.

[11] A communication method includes the steps of: causing a first station to emit time-divided optical pulses into a transmission path and measure a phase difference between the optical pulses returning from the transmission path; and causing a second station to combine orthogonally polarized components of each optical pulse and reemit the optical pulses into the transmission path, wherein the second station has the transmission path for serving as a transmission medium of light, means for reversing a traveling direction of the optical pulses, means for producing the phase difference, corresponding to a value of a random number bit to be transmitted, between the time-divided optical pulses, means for splitting the entering optical pulse into the orthogonally polarized components and producing a 180-degree phase difference between the orthogonally polarized components, means for rotating polarization direction of each polarized component by 90 degrees.

[12] The communication method according to [11], wherein a phase modulator is used as the means for producing the phase difference, and by varying driving voltage to the phase modulator, the 180-degree phase difference is produced between the orthogonally polarized components.

[13] The communication method according to [11], wherein a single phase modulator is used as the means for producing the phase difference corresponding to the value of the random number bit to be transmitted and the means for producing the 180-degree phase difference between the orthogonally polarized components, and by temporally varying driving voltage, the phase difference corresponding to the value of the random number bit and the 180-degree phase difference between the orthogonally polarized components are produced at the same time.

[14] The communication method according to [11], wherein after each entering optical pulse is split into orthogonally polarized components, the split polarized components are input to different terminals of a phase modulator, and the polarized directions thereof are rotated by 90 degrees after the phase difference is produced therebetween, and then the split polarized components are recombined.

[15] The communication method according to [14], wherein after each entering optical pulse is split into the orthogonally polarized components, distances along which the split polarized components propagate before entering the phase modulator are set to be different for each polarized component, and by temporally varying driving voltage, the phase difference corresponding to the value of the random number bit and the 180-degree phase difference between the orthogonally polarized components are produced at the same time.

[16] The communication method according to [14], wherein after each entering optical pulse is split into the orthogonally polarized components, optical paths along which the split polarized components propagate before entering the different terminals of the phase modulator is composed of a polarization-maintaining optical fiber.

[17] The communication method according to [16], wherein by orienting a polarizing axis of the polarization-maintaining optical fiber along electric-field vectors of the orthogonally polarized components of the entering optical pulse, the split polarized components are combined with their polarization directions rotated by 90 degrees.

[18] The communication method according to [14], [15], or [16], wherein a Faraday rotator is used as the means for producing the 180-degree phase difference between the orthogonally polarized components and the means for rotating each polarization direction by 90 degrees.

[19] The communication method according to [11], wherein a polarization beam splitter is used as the means for splitting each of the optical pulses into the orthogonal components and means for combining the orthogonal components, and antireflection termination is provided at a port, from which a polarized component resulting from a deviation from a polarization rotation angle of 90 degrees is output, of the polarization beam splitter.

[20] The communication method according to any one of [11] to [19], wherein the second station has means for attenuating intensity of each optical pulse to include no more than 1 photon per bit when reemitting the optical pulses into the transmission path after combining the orthogonally polarized components, so that a quantum cryptographic key is distributed.

In particular, the communication systems and the communication methods using the same according to the present invention include the first station (i.e., the receiver), the transmission path, and the second station (i.e., the transmitter). The first station has means for emitting the time-divided optical pulses into the transmission path and measuring the phase difference between the optical pulses returning from the transmission path. The transmission path serves as the transmission medium of the light. The second station has means for reversing the traveling direction of the optical pulses, means for producing the phase difference, corresponding to the value of the random number bit to be transmitted, between the time-divided optical pulses, means for splitting each entering optical pulse into the orthogonally polarized components and producing the 180-degree phase difference between the orthogonally polarized components, and means for rotating each polarization direction by 90 degrees. The second station may further include means for eliminating the polarized component resulting from a deviation from the polarization rotation angle of 90 degrees when combining the orthogonally polarized components, and means for attenuating the intensity of the optical pulses to include no more than 1 photon per bit when reemitting the optical pulses into the transmission path.

BEST MODE FOR CARRYING OUT THE INVENTION

According to first advantage of the present invention, an optical pulse is split into two orthogonally polarized components at a second station (i.e., a transmitter). By rotating one of the polarized components by 90 degrees, polarization directions of light entering a phase modulator are made to be the same and constant. Thus, a quantum cryptography system capable of employing a phase modulator having a polarization dependency can be provided.

According to second advantage of the present invention, the polarization directions of the optical pulses are made to be orthogonal to their originals. In addition, the phases of the orthogonally polarized components are reversed. Thus, a quantum cryptography system capable of maintaining security against disturbance of a polarization state at a transmission path without using a Faraday mirror can be provided.

According to third advantage of the present invention, the polarization directions of the optical signals entering the second station (i.e., the transmitter) and output from the second station are made to be orthogonal without using the Faraday mirror. Thus, a quantum cryptography system having a constant cryptographic key generation rate independent of a change in environmental temperature and the accuracy of Faraday elements can be provided.

According to fourth advantage of the present invention, at the second station (i.e., the transmitter), after splitting the optical pulse into two orthogonally polarized components, the polarization direction of each polarized component is rotated by 90 degrees. When the orthogonally polarized components are combined, a polarized component resulting from a deviation from a polarization rotation angle of 90 degrees is eliminated. Thus, a quantum cryptography system having a constant cryptographic key generation rate independent of the accuracy of the polarization rotation at the second station can be provided.

The entering optical pulse is split into orthogonally polarized components. A 180-degree phase difference is produced between these orthogonally polarized components. Then the polarization direction of each component is rotated by 90 degrees. When the split orthogonally polarized components are combined, the polarized component resulting from the deviation from the polarization rotation angle of 90 degrees is eliminated. With the above procedure, the 90-degree polarization rotation can be accurately implemented with a reversing configuration for preserving the security against the disturbance of the polarization state at the transmission path but without using Faraday mirrors. In addition, a quantum cryptography system capable of employing phase modulators having the polarization dependency is provided.

Embodiments

Embodiments of the present invention will be described in detail with reference to the drawings.

Figure 1:
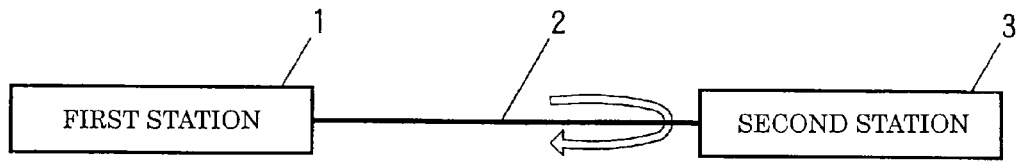
FIG. 1 is a schematic configuration diagram illustrating a quantum cryptography system according to an embodiment of the preset invention.

FIG. 1 is a schematic configuration diagram of a communication system (a quantum cryptography system) according to an embodiment of the present invention.

As shown in this figure, a quantum cryptography system of the present invention includes a first station (a receiver) 1, a transmission path 2, and a second station (a transmitter) 3. Optical pulses are emitted from the first station 1 into the transmission path 2, modulated at the second station 3, and returned into the transmission path 2. Then, bit values of the optical pulses are measured at the first station 1.

Accordingly, the first station 1 has means for emitting temporally divided optical pulses into the transmission path 2 and measuring a phase difference between the optical pulses returning from the transmission path 2.

After their polarization states are disturbed at the transmission path 2, the time-divided optical pulses, emitted from the first station 1 into the transmission path 2, enter the second station 3. At the second station 3, each of the optical pulses is split into two orthogonally polarized components. One of the two polarized components directly enters a first phase modulator, whereas the other enters a second phase modulator after having its polarization direction rotated by 90 degrees. According to a value of a random number bit, the first phase modulator produces a phase difference between the optical pulses time-divided at the first station 1. The second phase modulator produces the same phase difference as the first phase modulator between the other optical pulses. At this time, the orthogonally polarized components of each optical pulse are modulated to have a phase difference of 180 degrees therebetween. After the polarization direction is rotated by 90 degrees, an output of the first phase modulator is combined with an output of the second phase modulator. Before being returned into the transmission path 2, the combined optical pulses are attenuated by an attenuator to include no more than 1 photon per bit. After the above process has been performed, the time-divided optical pulses returning to the first station 1 have the phase difference corresponding to the value of the random number bit, and their polarization directions are reversed. By measuring the phase difference between these optical pulses with an interferometer included in the first station 1, the value of the transmitted random number bit can be obtained.

Regardless of disturbance at the transmission path 2, the polarized light, orthogonal to the polarized light that has been emitted from the first station 1, returns to the first station 1. This can be explained using the following equations. Let the polarization light be expressed by a two-dimensional vector $$\vec{E} = \begin{pmatrix} E_x \\ E_y \end{pmatrix} \qquad \text{[Equation 1]}$$

the disturbance of the polarization state is caused by polarization rotation, which can be denoted as $$R_0(\theta) = \begin{pmatrix} \cos\theta & -\sin\theta \\ \sin\theta & \cos\theta \end{pmatrix} \qquad \text{[Equation 2]}$$

and the phase difference between the orthogonally polarized components, which can be represented as $$R_i(\phi) = \begin{pmatrix} \exp[i\phi/2] & 0 \\ 0 & \exp[-i\phi/2] \end{pmatrix} \quad \text{[Equation 3]}$$

It is known that the polarization state after passing through the transmission path 2 can be generally expressed as $$\vec{E}' = \begin{pmatrix} E'_x \\ E'_y \end{pmatrix} = R_i(\gamma)R_0(\beta)R_i(\alpha)\vec{E} \quad \text{[Equation 4]}$$

Meanwhile, reversing the traveling direction of the light changes the polarization state of the light such as $E'_x \to E'_x$ and $E_x' \to -E_y'$. Furthermore, when a 180-degree phase difference is produced between the orthogonal polarization components, and then their polarization directions are rotated by 90 degrees, the polarization state of the light reemitted into the transmission path 2 can be expressed as $$\vec{E}'' = \begin{pmatrix} E'_y \\ E'_x \end{pmatrix} = \begin{pmatrix} 0 & 1 \\ 1 & 0 \end{pmatrix}\vec{E}' \quad \text{[Equation 5]}$$

The polarization state obtained after passing through the transmission path 2 can be denoted as $$\vec{E}^{(f)} = R_i(\alpha)R_0(\beta)R_i(\gamma)\vec{E}'' = \quad \text{[Equation 6]}$$
$$R_i(\alpha)R_0(\beta)R_i(\gamma)\begin{pmatrix} 0 & 1 \\ 1 & 0 \end{pmatrix}R_i(\gamma)R_0(\beta)R_i(\alpha)\vec{E}$$

Here, using $$\begin{pmatrix} \exp[i\phi/2] & 0 \\ 0 & \exp[-i\phi/2] \end{pmatrix}\begin{pmatrix} 0 & 1 \\ 1 & 0 \end{pmatrix} \quad \text{[Equation 7]}$$
$$\begin{pmatrix} \exp[i\phi/2] & 0 \\ 0 & \exp[-i\phi/2] \end{pmatrix} = \begin{pmatrix} 0 & 1 \\ 1 & 0 \end{pmatrix}$$
$$\begin{pmatrix} \cos\theta & -\sin\theta \\ \sin\theta & \cos\theta \end{pmatrix}\begin{pmatrix} 0 & 1 \\ 1 & 0 \end{pmatrix}\begin{pmatrix} \cos\theta & -\sin\theta \\ \sin\theta & \cos\theta \end{pmatrix} = \begin{pmatrix} 0 & 1 \\ 1 & 0 \end{pmatrix}$$

Equation 6 can be expressed as $$\vec{E}^{(f)} = \begin{pmatrix} 0 & 1 \\ 1 & 0 \end{pmatrix}\vec{E} = \begin{pmatrix} E_y \\ E_x \end{pmatrix} \quad \text{[Equation 8]}$$

Thus, it is clear that, regardless of the disturbance of the polarization state at the transmission path 2, the polarized light orthogonal to the original polarized light returns. A condition for this is that characteristics of the transmission path 2 do not change during a period necessary for the optical pulse to go and return through the transmission path 2. For example, it takes 0.5 ms for the optical pulse to go and return through a 50 km optical fiber. However, it is known that the polarization state in the optical fiber does not change for a few seconds to a few hours. Therefore, the above condition is satisfied.

Figure 2:
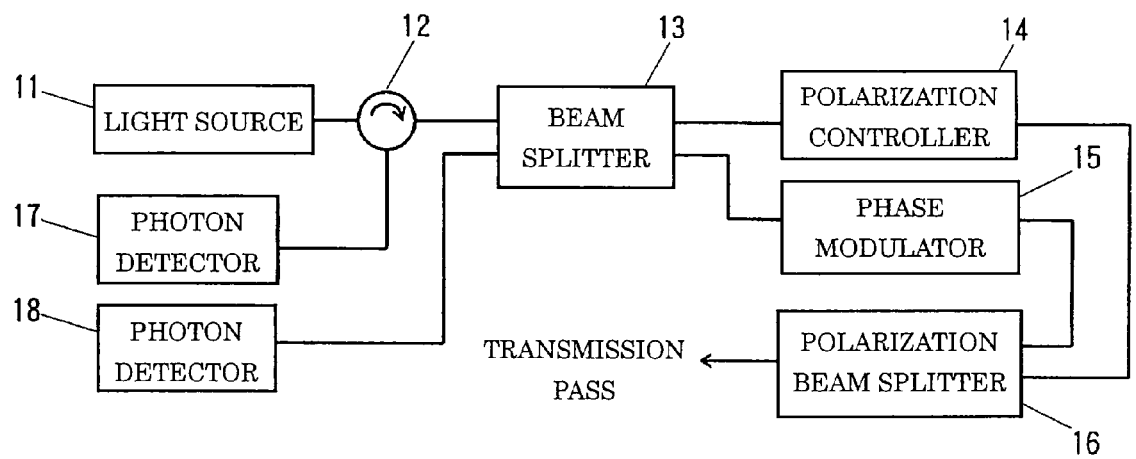
FIG. 2 is a configuration diagram illustrating a first station of a quantum cryptography system according to an embodiment of the present invention.

FIG. 2 is a configuration diagram of a receiver (a first station) according to an embodiment of the present invention.

As shown in this figure, the first station 1 includes a light source 11, a circulator 12, a beam splitter 13, a polarization controller 14, a phase modulator 15, a polarization beam splitter 16, and photon detectors 17 and 18.

An optical pulse emitted from the light source 11 passes through the circulator 12, and is split into two optical pulses by the beam splitter 13. One of the split optical pulses passes through the phase modulator 15, and enters the polarization beam splitter 16. The other split optical pulse also enters the other port of the polarization beam splitter 16 with its polarization direction rotated by 90 degrees by the polarization controller 14. After being combined by the polarization beam splitter 16, the split optical pulses are emitted into the transmission path 2 as time-divided optical pulses. An optical-path difference from the split of the optical pulse performed by the beam splitter 13 to the combination performed by the polarization beam splitter 16 is configured such that a time difference between the time-divided optical pulses is longer than their optical pulse width and shorter than their pulse intervals.

After passing through the transmission path 2, the light enters the second station 3.

Figure 3:
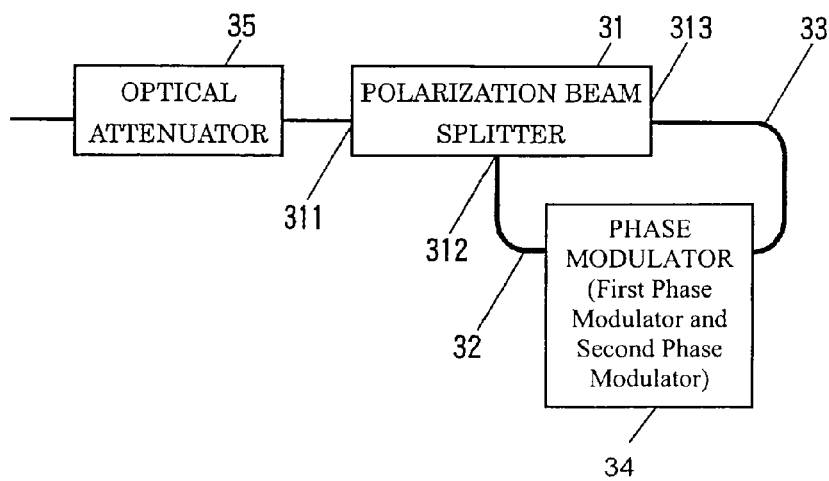
FIG. 3 is a configuration diagram illustrating a second station of a quantum cryptography system according to an embodiment of the present invention.
Figure 4:
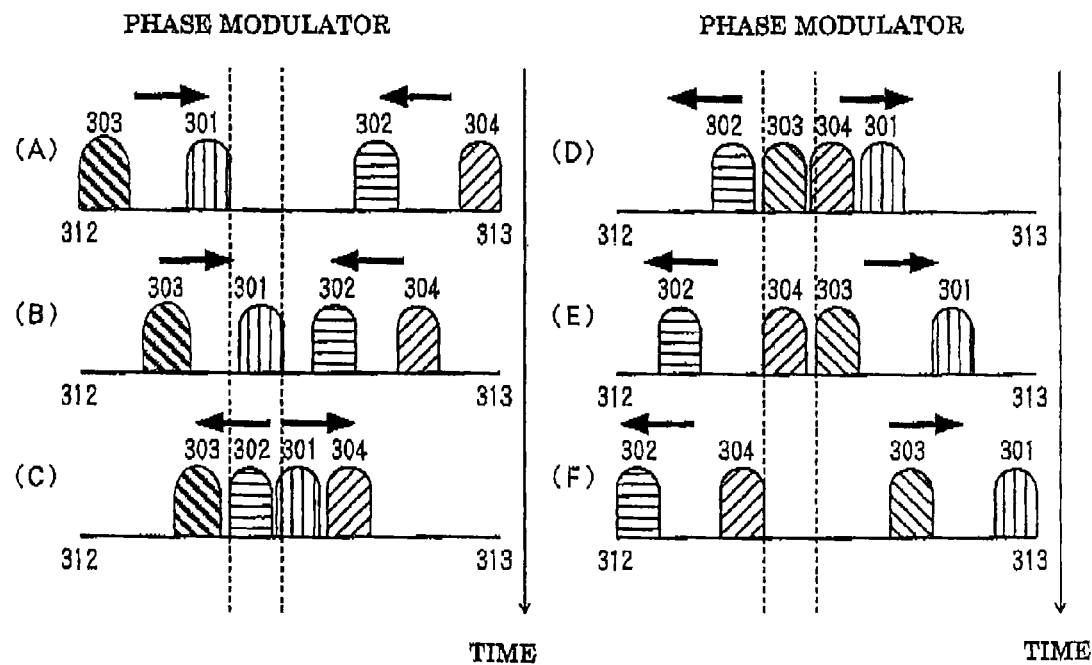
FIG. 4 is a diagram illustrating a time sequence of optical pulses propagating in a second station of a quantum cryptography system of the present invention.

FIG. 3 is a configuration diagram of a transmitter (the second station) according to an embodiment of the present invention. FIG. 4 is a diagram illustrating a time sequence of optical pulses propagating in the second station according to an embodiment of the present invention.

As shown in FIG. 3, the second station 3 includes a polarization beam splitter 31, polarization-maintaining optical fibers 32 and 33, a phase modulator 34, and an optical attenuator 35.

In the second station 3, after passing through the optical attenuator 35, the entering lights are split into orthogonally polarized components by the polarization beam splitter 31 to produce four optical pulses 301 to 304 as shown in FIG. 4. In FIG. 4, the optical pulses 301, 302, 303, and 304 correspond to one of the polarized components of a first time-divided pulse, the orthogonally polarized component of the first time-divided pulse, one of the polarized components of a second time-divided pulse, and the orthogonally polarized component of the second time-divided pulse, respectively. Each of the polarized components is output from a port 312 or 313 of the polarization beam splitter 31. The ports 312 and 313 are coupled to the polarization-maintaining optical fibers 32 and 33, respectively, such that electric-field vectors are oriented along slow axes. The other ends of the polarization-maintaining optical fibers 32 and 33 are coupled to the ends of the phase modulator 34. Since the electric-field vectors are oriented along the slow axes of the polarization-maintaining optical fibers 32 and 33, the polarization directions of all the optical pulses entering the phase modulator 34 are the same. The lengths of the polarization-maintaining optical fibers 32 and 33 are set so that the optical pulses 301 and 303, each corresponding to one of the polarized components, enter the phase modulator 34 a time period T earlier than the optical pulses 302 and 304, each corresponding to the other polarized component. Provided that the period T is configured to be longer than the optical pulse width and shorter than the interval between the time-divided optical pulses. The optical pulses 301 and 303, output from the phase modulator 34, enter the port 313 of the polarization beam splitter 31 through the polarization-maintaining optical fiber 33. In addition, the optical pulses 302 and 304, output from the phase modulator 34, enter the port 312 of the polarization beam splitter 31 through the polarization-maintaining optical fiber 32. The pairs of the optical pulses 301 and 302 as well as 303 and 304, which have passed through the same polarization-maintaining optical fibers 32 and 33 in the opposite direction, enter the polarization beam splitter 31 at the same time, and are combined. The combined optical pulses enter the optical attenuator 35 to be attenuated to have an average photon number of a predetermined value between 0.1 and 1. Then, the combined optical pulses propagate through the transmission path 2, and return to the first station 1.

In the second station 3, the electric-field vectors are oriented along the slow axes of the polarization-maintaining optical fibers 32 and 33 in order to rotate the polarization direction by 90 degrees. However, the electric-field vectors may be oriented along any direction as long as the polarization is preserved in the optical fibers. In addition, the optical pulses may propagate through a non-polarizing single-mode optical fiber or a free space, and be rotated using a polarization controller including a wave plate or the like.

The optical attenuator 35 is provided in the second station 3. However, the optical attenuator 35 may be provided in the first station 1 so as to adjust the average photon number from the second station 3 to the first station 1 to be a predetermined value between 0.1 and 1.

Accordingly, as shown in FIG. 4, due to the difference between the optical path lengths to the phase modulator 34, the light output from the ports 312 and 313 enter the phase modulator 34 at different timings between the time points of FIG. 4(A) and FIG. 4(F). Thus, varying voltage applied to the phase modulator 34 in synchronization with the pulse intervals enables application of various phase differences to each optical pulse. The phase differences applied to each optical pulse are set as shown in Table 1.

TABLE 1

| bit value | phase(301) | phase(302) | phase(303) | phase(304) |
|---|---|---|---|---|
| 0 | 0° | 180° | 0° | 180° |
|  | 0° | 180° | 90° | 270° |
| 1 | 0° | 180° | 180° | 0° |
|  | 0° | 180° | 270° | 90° |

When the value of the random number bit is "0", a phase difference of 0 degrees or 90 degrees is produced between the time-divided optical pulses 301 and 303, whereas when the value of the random number bit is "1", a phase difference of 180 degrees or 270 degrees is produced between the time-divided optical pulses 301 and 303. The same phase difference as that between the optical pulses 301 and 303 is produced between the optical pulses 302 and 304, i.e., the orthogonally polarized components of the optical pulses 301 and 303, respectively. At the same time, phase differences of 180 degrees are produced between the optical pulses 301 and 302 as well as the optical pulses 303 and 304.

Each optical pulse returns to a port different from the port of the polarization beam splitter 31 from which the optical pulse was originally output. Accordingly, each optical pulse having the polarization direction orthogonal to its original is emitted from a port 311 of the polarization beam splitter 31.

Use of a polarization beam splitter for splitting and combining each pair of optical pulses enables stable cryptographic key generation independent of the accuracy of the 90-degree polarization rotation. This can be explained as follows.

Figure 6:
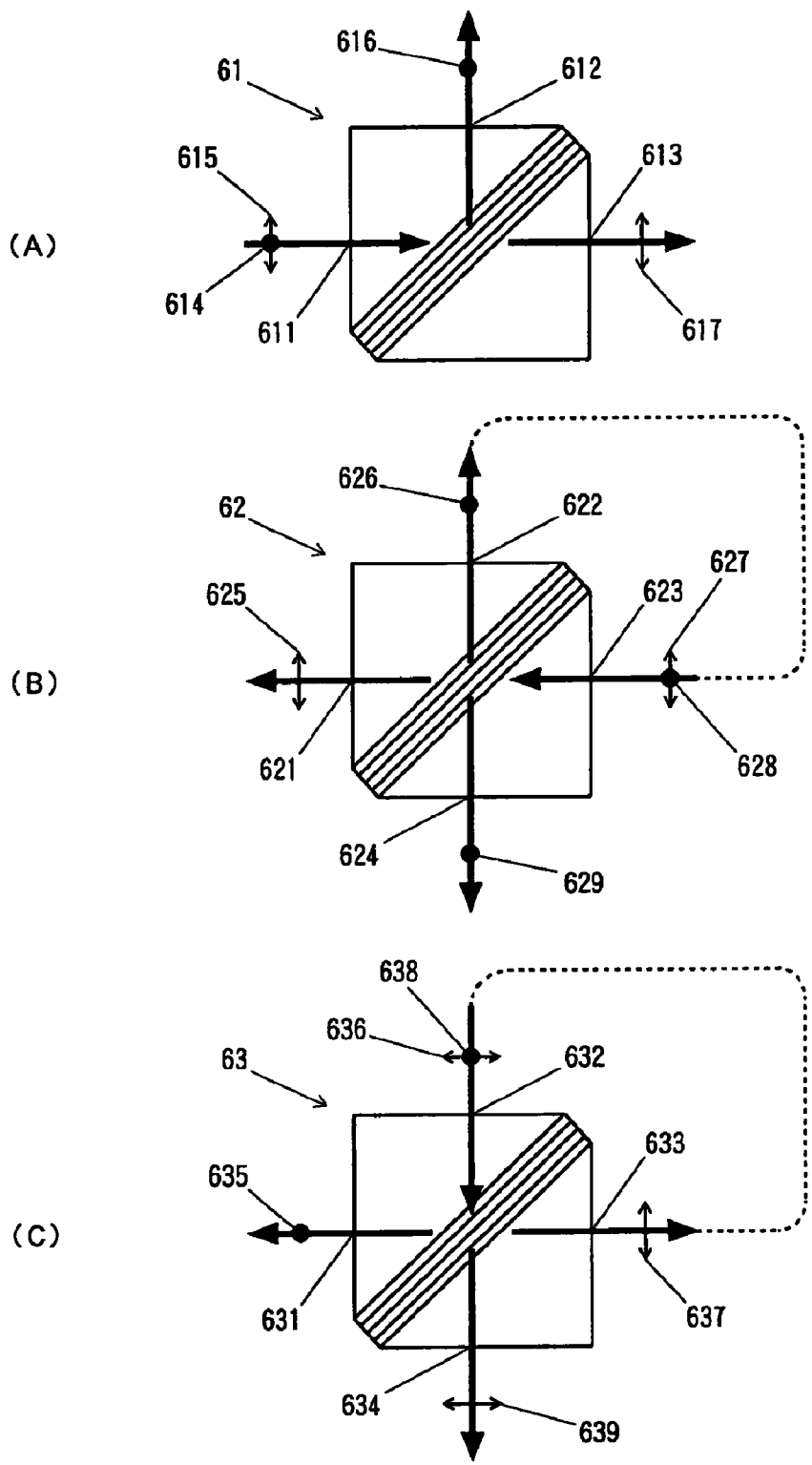
FIG. 6 is a diagram illustrating splitting and combining of polarized components in a polarization beam splitter of a quantum cryptography system of present invention.

Referring to FIG. 6, the splitting and combining of the polarized components in a polarization beam splitter will be described. The polarization beam splitter is a general term for an optical system that splits entering light into two orthogonally polarized components in a broad sense. However, herein, a configuration generally used in an optical communication field is described. As shown in FIG. 6(A), this configuration includes two prisms and a dielectric multilayer. By utilizing Brewster's angle of reflection and refraction, this configuration reflects only an s-polarized component 614 orthogonal to an incidence plane, and transmits only a p-polarized component 615 in the incidence plane. After entering a port 611 of a polarization beam splitter 61 from the transmission path, the optical pulse is split into the polarized components (i.e., an s-polarized component 616 and a p-polarized component 617), which are then emitted from ports 612 and 613, respectively.

After being rotated by 90 degrees, each polarized component returns to a port different from that of the polarization beam splitter 61 from which the polarized component was emitted. Suppose, at this time, a pure linear polarization state is not obtained because the rotation angle deviates from 90 degrees. More specifically, as shown in FIG. 6(B), when the light is emitted from a port 622, a linear polarization including only an s-polarized component 626 is emitted, and a linear polarization including only a p-polarized component 627 is supposed to enter a port 623 after being rotated by 90 degrees. Nevertheless, due to the deviation of the polarization rotation angle, the entering light also includes an s-polarized component 628. Among these light components, the p-polarized component 627 passes through the polarization beam splitter 62 (i.e., a p-polarized component 625), and returns into the transmission path from a port 621, whereas the s-polarized component 628 is reflected by the polarization beam splitter 62 (i.e., an s-polarized component 629), and emitted from a port 624.

On the other hand, a case where a p-polarization component 637 is emitted from a port 633 of the polarization beam splitter is shown in FIG. 6(C). Likewise, in this case, only an s-polarized component 638 is supposed to enter a port 632, however, a p-polarized component 636 is also included in the entering light. Among these light components, the s-polarized component 638 is reflected by a polarization beam splitter 63 (i.e., an s-polarized component 635), and emitted back into the transmission path from a port 631, whereas the p-polarized component 636 passes through the polarization beam splitter 63 (i.e., a p-polarized component 639), and is emitted from a port 634. Terminating the ports 624 and 634 prevents these light components from returning to the interferometer. If the polarization rotation angle deviates from 90 degrees in the second station, the appropriate modulation cannot be performed in the first station. Accordingly, visibility of the interferometer degrades, which leads to a decrease in the accuracy of cryptographic key generation. However, as described above, use of the polarization beam splitter for splitting and combining the polarized components at the second station can prevent this decrease in the accuracy.

In the above example, a description of a polarization beam splitter having four ports is given. However, giving antireflection termination at ports, corresponding to the ports 624 and 634, of a polarization beam splitter having three ports can provide the same advantages. In addition, the configuration of the polarization beam splitter is not limited to the above configuration. A polarization beam splitter having a uniaxial optical crystal or a fiber-fused polarization beam splitter may be used.

As described above, the second station 3 performs three operations, namely, reversing the traveling direction of the light, rotating the polarization direction by 90 degrees, and producing the 180-degree phase difference between the orthogonally polarized components. In particular, in this embodiment, since the light having the orthogonally polarized components propagates through the same path in the opposite direction, the disturbance at the optical path is offset, thus implementing the stable second station 3.

After propagating through the transmission path 2 in the opposite direction, the optical pulses reenter the first station 1. According to the polarization direction, the polarization beam splitter 16 directs the optical pulses to the corresponding optical paths. Since the polarization direction of the time-divided optical pulses returning to the first station 1 is orthogonal to that being output from the first station 1, the optical-path difference in the first station 1 is offset. Accordingly, the time-divided optical pulses enter the beam splitter 13 at the same time. At one of the optical paths, the polarization controller 14 rotates the polarization direction by 90 degrees. Thus, the light that has passed through two optical paths interferes. A receiver selects a phase modulation of 0 degrees or 90 degrees, and applies the selected modulation to the optical pulses with the phase modulator 15. If the phase modulation of 0 degrees, corresponding to the bit value "0", is performed on the optical pulses 301 and 303 at the second station 3, and the receiver performs the phase modulation of 0 degrees on these optical pulses using the phase modulator 15, photons are observed only at the photon detector 17. If the phase modulation of 180 degrees, corresponding to the bit value "1", is performed on the optical pulses 301 and 303 at the second station 3, and the receiver performs the phase modulation of 0 degrees on these optical pulses using the phase modulator 15, photons are observed only at the photon detector 18.

Likewise, if the phase modulation of 90 degrees, corresponding to the bit value "0", is performed on the optical pulses 301 and 303 at the second station 3, and the receiver performs the phase modulation of 90 degrees on these optical pulses using the phase modulator 15, photons are observed only at the photon detector 17. If the phase modulation of 270 degrees, corresponding to the bit value "1", is performed on the optical pulses 301 and 303 at the second station 3, and the receiver performs the phase modulation of 90 degrees on these optical pulses using the phase modulator 15, photons are observed only at the photon detector 18. Accordingly, when the phase modulation performed at the first station 1 is suitable in relation to the phase modulation performed at the second station 3, the transmitted bit value can be obtained at the first station 1 by detecting the photons at either the photon detector 17 or 18. More specifically, the phase modulation of 0 degrees, 90 degrees, 180 degrees, or 270 degrees is performed at the first station 1.

Figure 5:
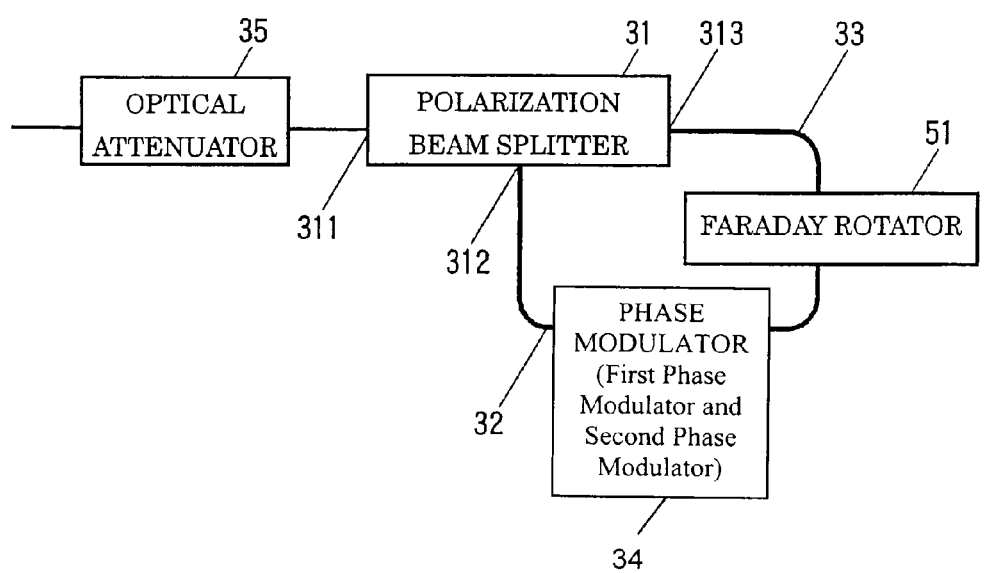
FIG. 5 is a configuration diagram illustrating a second station of a quantum cryptography system according to a second embodiment of the present invention.

In the above embodiment, a Faraday rotator may be used for producing the 180-degree phase difference between the orthogonally polarized components and rotating each polarized component by 90 degrees. A second embodiment having this configuration is shown in FIG. 5.

In the second embodiment, although a Faraday rotator 51 is necessary, a phase modulator 34 produces the same phase difference only between optical pulses 303 and 304 among time-divided optical pulses. Thus, a period of voltage applied to the phase modulator 34 can be doubled, which advantageously simplifies the configuration of a voltage control circuit.

The present invention is not limited to the foregoing embodiments and various modifications may be made in keeping with the spirit of the present invention. These modifications are not to be excluded from the scope of the present invention.

INDUSTRIAL APPLICABILITY

The present invention can be utilized as a quantum cryptography system for sharing cryptographic keys through optical fiber communication.

The invention claimed is:

1. A communication system comprising:
    a transmission path for serving as a transmission medium of light;
    a first station which emits time-divided optical pulses into the transmission path, returns optical pulses modulated at a second station into the transmission path, and measures a phase difference between the optical pulses returning from the transmission path; and
    the second station including,
        a polarization beam splitter splitting the time-divided optical pulses into first orthogonally polarized components and second orthogonally polarized components,
        a first phase modulator receiving the first of the split optical pulses and producing the phase difference corresponding to a value of a random number bit between the time-divided optical pulses, and
        a second phase modulator receiving the second of the split optical pulses after polarization direction of the second of the split optical pulses is rotated by 90 degrees, producing a same phase difference as the first phase modulator between the first of the optical pulses, and modulating the orthogonally polarized components of each optical pulse to have a phase difference of 180 degrees therebetween,
        wherein an output of the first phase modulator is combined with an output of the second phase modulator after the polarization direction is rotated by 90 degrees, and then the combined output returns into the transmission path.

2. The communication system according to claim 1, wherein a single phase modulator is configured as the first phase modulator and configured as the second phase modulator.

3. The communication system according to claim 2, wherein after each optical pulse entering the second station is split into the orthogonally polarized components, distances along which the split polarized components propagate before entering the phase modulator are set to be different for each polarized component, and by temporally varying driving voltage, the phase difference corresponding to the value of the random number bit and the 180-degree phase difference between the orthogonally polarized components are produced at the same time.

4. The communication system according to claim 2, wherein after each optical pulse entering the second station is split into the orthogonally polarized components, optical paths along which the split polarized components propagate before entering the different terminals of the phase modulator are composed of a polarization-maintaining optical fiber.

5. The communication system according to claim 4, wherein by orienting a polarizing axis of the polarization-maintaining optical fiber along electric-field vectors of the orthogonally polarized components of the entering optical pulse, the split polarized components are combined with their polarization directions rotated by 90 degrees.

6. The communication system according to claim 3 or 4, wherein a Faraday rotator modulates the orthogonally polarized components of each optical pulse to have a phase difference of 180 degrees therebetween and rotates the polarization direction by 90 degrees.

7. The communication system according to claim 1, wherein antireflection termination is provided at a port, from which a polarized component resulting from a deviation from the polarization rotation angle of 90 degrees is output, of the polarization beam splitter.

8. The communication system according to claim 1, wherein the second station has means for attenuating intensity of each optical pulse to include no more than 1 photon per bit when reemitting the optical pulses into the transmission path after combining the output of the first phase modulator with the output of the second phase modulator, so that a quantum cryptographic key is distributed.

9. A communication method comprising:

emitting, at a first station, time-divided optical pulses into a transmission path, returning optical pulses modulated at a second station into the transmission path, and measuring a phase difference between the optical pulses returning from the transmission path;

splitting, by a polarization beam splitter at the second station, the time-divided optical pulses into first orthogonally polarized components and second orthogonally polarized components;

receiving, by a first phase modulator at the second station, the first of the split optical pulses, and producing the phase difference corresponding to a value of a random number bit between the time-divided optical pulses;

receiving, by a second phase modulator at the second station, the second of the split optical pulses after polarization direction of the second of the split optical pulses is rotated by 90 degrees, producing a same phase difference as the first phase modulator between the first of the optical pulses, and modulating the orthogonally polarized components of each optical pulse to have a phase difference of 180 degrees therebetween; and combining, at the second station, an output of the first phase modulator with an output of the second phase modulator after the polarization direction is rotated by 90 degrees, and then returning the combined output into the transmission path.

10. The communication method according to claim 9, wherein a single phase modulator is configured as the first phase modulator and configured as the second phase modulator.

11. The communication method according to claim 10, wherein after each optical pulse entering the second station is split into the orthogonally polarized components, distances along which the split polarized components propagate before entering the phase modulator are set to be different for each polarized component, and by temporally varying driving voltage, the phase difference corresponding to the value of the random number bit and the 180-degree phase difference between the orthogonally polarized components are produced at the same time.

12. The communication method according to claim 10, wherein after each optical pulse entering the second station is split into the orthogonally polarized components, optical paths along which the split polarized components propagate before entering from the different terminals of the phase modulator to the polarization beam splitter is composed of a polarization-maintaining optical fiber.

13. The communication method according to claim 12, wherein by orienting a polarizing axis of the polarization-maintaining optical fiber along electric-field vectors of the orthogonally polarized components of the entering optical pulse, the split polarized components are combined with their polarization directions rotated by 90 degrees.

14. The communication method according to claim 11 or 12, wherein a Faraday rotator modulates the orthogonally polarized components of each optical pulse to have a phase difference of 180 degrees therebetween rotates the polarization direction by 90 degrees.

15. The communication method according to claim 9, wherein antireflection termination is provided at a port, from which a polarized component resulting from a deviation from a polarization rotation angle of 90 degrees is output, of the polarization beam splitter.

16. The communication method according to claim 9, wherein the second station has means for attenuating intensity of each optical pulse to include no more than 1 photon per bit when reemitting the optical pulses into the transmission path after the combining of the output of the first phase modulator with the output of the second phase modulator, so that a quantum cryptographic key is distributed.

* * * * *